United States Patent Office 3,600,380
Patented Aug. 17, 1971

3,600,380
CERTAIN 1-ARALKYL-3-AZETIDINOL
COMPOUNDS
Elijah H. Gold, West Orange, N.J., assignor to
Schering Corporation, Bloomfield, N.J.
No Drawing. Filed May 10, 1968, Ser. No. 728,335
Int. Cl. C07d 25/00
U.S. Cl. 260—239A                    10 Claims

ABSTRACT OF THE DISCLOSURE

Novel 1-(α-alkylphenethyl)-3-azetidinols and pharmaceutically acceptable ester and ether derivatives thereof are disclosed. The compounds are effective as stimulants with reduced autonomic side effects. Certain of these compounds are also useful as anorectics.

---

This invention relates to compositions of matter identifiable in the art of chemistry as 1-(α-alkylphenthyl)-3-azetidinols and pharmaceutically acceptable ester and ether derivatives thereof and to processes for making and using such compositions.

The invention sought to be patented in its composition aspect is described as residing in the concept of a chemical compound having the molecular structure of a D-1-(α-alkylphenethyl)-3-azetidinol and pharmaceutically acceptable ester and ether derivatives thereof, said compounds optionally having a lower alkyl radical substituted at each of the 2 and 4 carbon atom positions in the azetidine ring and optionally having substituents on the phenyl nucleus. Also included within this concept are the pharmaceutically acceptable acid addition salts of these compounds.

The invention sought to be patented in another of its composition aspects resides in the concept of a pharmaceutical formulation containing a novel composition of matter of this invention.

The invention sought to be patented in one of its process aspects is described as residing in those concepts which comprise the condensation of an epihalohydrin with a D-α-alkylphenethylamine.

The invention sought to be patented in another of its process aspects is described as residing in the concept of effecting stimulation of the central nervous system of a mammal by administering a therapeutically effective quantity of a novel composition of matter of this invention. Another process aspect of this invention is the use of certain of the novel compositions of this invention to cause appetite depression.

A more specific representation of the tangible embodiments of this invention are the chemical compositions having the structural formula:

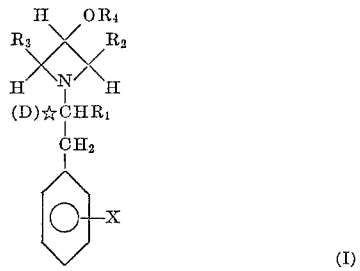

(I)

wherein $R_1$ is a lower alkyl radical; $R_2$ and $R_3$ are hydrogen or a lower alkyl radical; $R_4$ is hydrogen, a lower alkyl radical, or a pharmaceutically acceptable acyl radical; and X is hydrogen, fluorine, chlorine, bromine, trifluoromethyl, lower alkoxy or lower alkyl radical; and pharmaceutically acceptable acid addition salts thereof.

The lower alkyl radicals referred to above (including the alkyl portion of the lower alkoxy radical) may be straight or branched chain and include, for example, methyl, ethyl, n-propyl, iso-propyl, n-butyl, sec-butyl, iso-amyl, n-hexyl and the like. In each instance the preferred lower alkyl radical is methyl.

Acyl radicals may be derived from such normally pharmaceutically acceptable acids as monobasic lower alkyl carboxylic acids such as acetic, propionic, butyric and isobutyric; and polybasic organic acids such as succinic, maleic, tartaric and citric acid. The preferred acyl group is a lower alkanoyl radical, i.e. those having 1 to 6 carbon atoms, e.g. formyl, acetyl, propionyl, isobutyryl, valeryl and caproyl. Most preferably, the acyl radical is acetyl.

Exemplary of pharmaceutically acceptable acid addition salts are those formed with maleic, fumaric, succinic, tartaric, citric, malic, cinnamic, sulfonic, hydrochloric, hydrobromic, sulfuric, phosphoric, and nitric acids. The acid addition salts may be prepared in the conventional manner, by treating a solution or suspension of the free base in an organic solvent with the desired acid, and then recovering the salt which forms by crystallization techniques.

It is to be noted that the alpha carbon atom attached to the nitrogen atom in the compounds of Formula I is asymmetric, thus giving rise to optical isomers. This invention is more specifically directed to those stereoisomers which have the D configuration, i.e. by convention those configurationally related to (D+)-glyceraldehyde, regardless of whether they are dextrorotating or levorotating.

The compositions of this invention have the unobvious property that while they exhibit effective stimulant action, they do not provoke the serious side effects on the autonomic nervous system associated with commonly used stimulant compositions. More specifically, at equipotent stimulant doses, the compositions of this invention affect the heart and respiratory rate much less, and cause a lesser mydriatic reaction than does, for example, methamphetamine. Moreover, they are considerably less toxic than other stimulants in common use. In addition, the compounds of this invention wherein $R_4$ is hydrogen or a pharmaceutically acceptable acyl radical are also effective anorectics and may, in fact, be used for that purpose primarily. On the other hand, the compounds of this invention wherein $R_4$ is a lower alkyl radical have negligible anorectic activity and thus are particularly useful when stimulant actvity is desired without concomitant appetite depression and without serious autonomic side effects.

The compounds of Formula I may be prepared by condensing a primary amine of the Formula II with an epihalohydrin of the Formula III as follows:

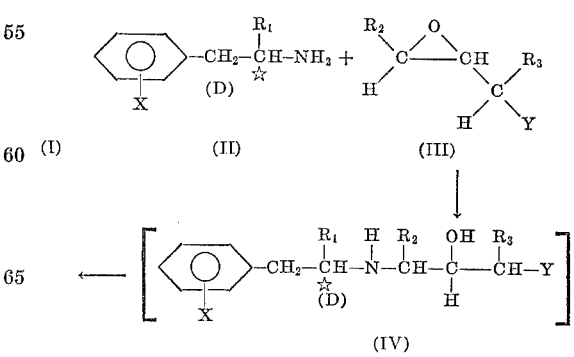

wherein $R_1$, $R_2$, $R_3$, $R_4$ and X have the meanings described above and Y is chlorine or bromine. The reaction is generally conducted in a polar organic solvent such as dimethylformamide, dimethylsulfoxide or methanol. The intermediate aminohalo propanol is preferably not isolated but rather directly cyclized in situ by heating at about 45–50° C. for several days.

The compounds of Formula I can also be prepared by mixing a 3-azetidinol with an alkylbenzyl ketone and reducing the resulting eneamine condensate in situ as follows:

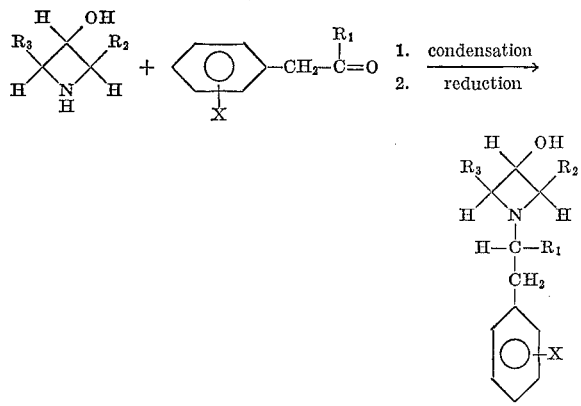

wherein $R_1$, $R_2$, $R_3$ and X are above defined. The reduction may be effected, for example, catalytically by hydrogenerating over a palladium catalyst (5% Pd/C) in a suitable solvent such as acetic acid.

The compounds of Formula I can also be prepared by alkylating a 3-hydroxy azetidine with an α-methylphenethyl halide as follows:

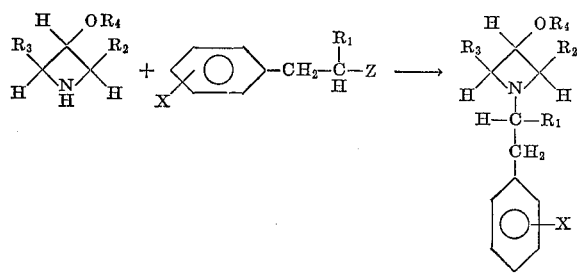

wherein $R_1$, $R_2$, $R_3$ and $R_4$ and X are as above defined and Z is chlorine, bromine, iodine, the tosylate radical or the like. The reaction is preferably carried out in a polar solvent such as methanol or dimethylformamide and in the presence of a suitable proton acceptor such as potassium carbonate.

As a variant of the above method, the reaction can be carried out in basic solution, e.g. sodium hydride in dimethylformamide or dimethylsulfoxide. Under such conditions, however, the hydroxyl function must be protected with a protecting group $R_5$ such as lower alkyl, tetrahydropyranyl, or methoxymethylene. The formation of such protective groups is well known in the art. The azetidinol I can be recovered by gentle hydrolysis under appropriate pH conditions.

It is to be noted, however, that the above N-alkylation methods produce racemic mixtures. The desired D isomer can be isolated in conventional manner via salt formation with an optically active resolving acid. Conventional resolving acids include d-tartaric acid, 1-malic acid, d-camphorsulfonic acid, 1-mandelic acid and the like. The techniques of salt formation and separation of the salts as by fractional crystallization are well known to those skilled in the art.

The compounds of Formula I can also be prepared by condensing a D-α-alkylphenethylamine with an ether of di-(chloromethyl)-carbinol as follows:

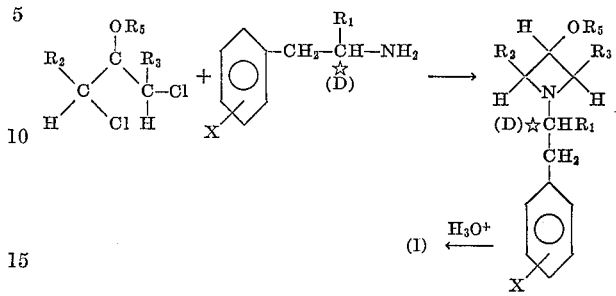

wherein $R_1$, $R_2$, $R_3$, $R_4$ and $R_5$ are as above defined.

The invention is further illustrated by reference to the following non-limiting representative examples.

EXAMPLE 1

Preparation of D-1-(β-phenylisopropyl)-3-azetidinol and its hydrochloride salt

Stir together, for 24 hours at room temperature, 55.0 g. of D-amphetamine (0.4 mole) and 36.6 g. of epichlorohydrin (0.4 mole) in 92 g. of dimethylsulfoxide. Continue stirring for seven days at 45–50° C. To the cooled reaction mixture, add 200 ml. of 10% sodium hydroxide solution and extract the aqueous mixture three times with 100 ml. portions of ether. Wash the combined ether extract three times with 100 ml. portions of water, dry the ether layer over sodium sulfate and remove the ether. Distill the residue rapidly (B.P. $^{0.1}$=118–121° C.) and obtain 16 g. of D-1-(β-phenylisopropyl)-3-azetidinol as an oil. Recrystallize from hexane, M.P.=105–105.5° C. Prepare the analytically pure hydrochloride salt by dissolving 3.8 g. of the analytically pure azetidinol in 25 ml. of methylene chloride, dilute with 100 ml. of ether and, with stirring, add 10 ml. of 3.5 N hydrogen chloride in ether. Filter and obtain 4.5 g. of analytically pure hydrochloride salt, M.P.=123–123.5° C., $[\alpha]_D^{25}=+10.8°$ (C=0.3% in $H_2O$).

EXAMPLE 2

Preparation of D-1-(β-phenylisopropyl)-3-acetoxy azetidine

Stir together for one hour at 90° C. 5.0 g. of D-1-(β-phenylisopropyl)-3-azetidinol (0.026 mole) (prepared as in Example 1) and 3.7 g. of acetic anhydride (0.036 mole). Cool and pour into 200 ml. of ice water containing 5 g. of sodium carbonate. Extract three times with 100 ml. portions of ether, wash the combined ether extract three times with 100 ml. portions of water, dry over sodium sulfate and remove the ether. Distill the residue (B.P. $^{0.01}$=86–89° C.) and obtain 4.1 g. of D-1-(β-phenylisopropyl)-3-acetoxyazetidine. To a stirred solution of 4.0 g. of the distillate in 150 ml. of ether add 6 ml. of 3.5 N hydrogen chloride in ether. Filter the salt (3.8 g.) and recrystallize it from a mixture of ethanol and ethyl acetate, M.P.=128.0–128.5° C., $[\alpha]_D^{26°}=+10.3°$ (C=0.3% in ethanol).

Similarly, by substituting propionic anhydride or n-butyric anhydride for acetic anhydride one can produce the corresponding 3-propionoxy or 3-n-butyroxy azetidines, respectively.

EXAMPLE 3

Preparation of D-1-(β-phenylisopropyl)-3-methoxyazetidine

Prepare under a nitrogen atmosphere a suspension of 2.7 g. of 52% sodium hydride (0.058 mole) dispersed in mineral oil in 60 ml. of dry dimethylformamide. While stirring, add thereto rapidly and dropwise 10.0 g. of D-1-(β-phenylisopropyl)-3-azetidinol (prepared as in Example 1) dissolved in 50 ml. of dry dimethylformamide; continue stirring for one hour at room temperature. Add 9.0 g. of methyl iodide (0.064 mole) in 10 ml. of dry dimethylformamide over 10 minutes, and maintain the reaction mixture at about 25° C. Stir for 1.5 hours, add 200 ml. of water to decompose the excess sodium hydride and extract three times with 150 ml. portions of ether. Wash the combined ether extract twice with 200 ml. portions of water, dry over sodium sulfate, remove the ether and distill the residue (B.P. $^{0.015}$=76–97° C.) to obtain 6.3 g. of D-1-(β-phenylisopropyl)-3-methoxy azetidine. To a stirred solution of 5.1 g. of the distillate in 65 ml. of ether, add 7 ml. of 3.5 N hydrogen chloride in ether. Stir until the precipitated salt solidifies, filter and obtain 5.3 g. Recrystallize from ethyl acetate, M.P.=101–102.5° C., $[\alpha]_D^{26°}$=+12.9° (C=0.3% in ethanol).

Similarly, by substituting the corresponding D-α-alkyl-phenethylamine and epihalohydrin one can analogously prepare the other compounds of this invention such as:

D-1-(β-phenylisopropyl)-2-methyl-3-azetidinol
D-1-(β-phenylisopropyl)-2,4-dimethyl-3-azetidinol,
D-1-(β-p-chlorophenylisopropyl)-3-azetidinol,
D-1-(β-m-tolylisopropyl)-3-azetidinol,
D-1-(α-ethylphenethyl)-3-azetidinol.

As a further variant, the 3-acyl derivatives can be prepared by selectively acylating the intermediate amino-chloropropanols (III).

Using standard techniques and standard procedures, the efficacy and toxicity of the compounds of this invention were studied in rats, cats and dogs with favorable results. From such tests as the Locomotor Treadwheel Activity Test as described in Irwin, "The Action of Drugs on Psychomotor Activity," Canadian Rev. Biology, vol. 20, p. 239 (1961), the effective stimulant dosage of the active ingredient of the composition of this invention is considered to be within the range of 0.1 to 10 mgs. per kg. of body weight and preferably 0.4 to 3 mgs. per kg. The effective anorectic dose for those compounds of this invention which are indicated above also to be anorectics is about the same as the effective stimulant dose. This dosage can be given once daily or can be divided and taken at given intervals during the day. In each specific instance, however, the attending diagnostician will determine the dosage, amount and frequency taking into account related health factors of the subject.

The compounds of this invention may be administered as such or together with suitable carriers which are pharmaceutically acceptable. A carrier is selected according to the route of administration to be used as well as according to the physical properties of the compounds and standard pharmaceutiacl practice. In a preferred embodiment the compositions of this invention, whether used primarily as stimulants or anorectics, are administered orally, although parenteral administration is also effective and within the scope of this invention. Such preparations may be in solid forms, as for example tablets and capsules, or in liquid forms, as for example syrups, elixirs, emulsions and injectables.

In the formulations of pharmaceutical preparations there can be employed such substances which do not react with the compounds, as for example, water, gelatin, lactose, starches, magnesium stearate, talc, vegetable oils, benzyl alcohols, gums, polyalkylene glycols, and petroleum jelly.

The following example illustrates a preparation of 200 mg. tablets containing 25 mg. of an active ingredient of this invention.

EXAMPLE 4

| Ingredient: | Quantity (grams) |
| --- | --- |
| D-1-(β-phenylisopropyl)-3-azetidinol hydrochloride | 250.0 |
| Lactose | 1000.0 |
| Corn starch | 600.0 |
| Corn starch as 10% paste | 50.0 |

Mix the D-1-(β-phenylisopropyl)-3-azetidinol hydrochloride, lactose and corn starch, and pass through a pulverizing mill if necessary. Granulate the mix with the starch paste and add additional water is necessary to make a damp granulation. Pass the granulation through an impact mill to produce 8–12 mesh granules. Spread the granulation on trays and dry in a draft-oven at 35–40° C. Reduce the dried granulation to 16–24 mesh. Blend the foregoing 1900 grams of "wet" granulation with 80.0 gm. of corn starch and 20.0 g. of magnesium stearate until a uniform mixture is obtained. Compress to 200 mg. tablets on 5/16 inch round punches.

Numerous other variants will be apparent to one skilled in the art within the spirit of this invention.

I claim:
1. A compound of the formula:

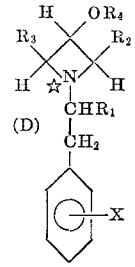

wherein $R_1$ is a lower alkyl radical; $R_2$ and $R_3$ are hydrogen or a lower alkyl radical; $R_4$ is hydrogen, a lower alkyl radical or a lower alkanoyl radical; X is hydrogen, fluorine, chlorine, bromine, trifluoromethyl, lower alkoxy, or a lower alkyl radical; and pharmaceutically acceptable acid addition salts thereof.

2. A compound according to claim 1 wherein $R_1$ is methyl.
3. A compound according to claim 2 wherein $R_2$ and $R_3$ are hydrogen.
4. A compound according to claim 3 wherein $R_4$ is hydrogen.
5. A compound according to claim 4 wherein X is hydrogen.
6. A compound according to claim 2 wherein $R_4$ is methyl.
7. A compound according to claim 2 wherein $R_4$ is propionyl.
8. A compound according to claim 2 wherein $R_4$ is acetyl.
9. A compound according to claim 1, said compound being D-1-(β-phenylisopropyl)-3-acetoxy azetidine.
10. A compound according to claim 1, said compound being D-1-(β-phenylisopropyl)-3-azetidinol hydrochloride.

References Cited

Gaj et al., Chemical Abstracts, vol. 67, Abstract No. 64129q (1967).

ALTON D. ROLLINS, Primary Examiner

U.S. Cl. X.R.

260—240D, 570.6; 424—244

PO-1050
(5/69)

UNITED STATES PATENT OFFICE
CERTIFICATE OF CORRECTION

Patent No. 3,600,380          Dated  August 17, 1971

Inventor(s)  Elijah H. Gold

It is certified that error appears in the above-identified patent and that said Letters Patent are hereby corrected as shown below:

Column 1, line 20 of the patent, "1-(α-alkylphenthyl)" should read --- 1(α-alkylphenethyl).

Column 3, lines 31 and 32 of the patent, "hydrogenerating" should read --- hydrogenating.

Claim 1 of the patent,

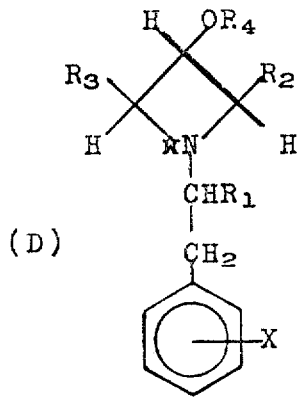

should read ---

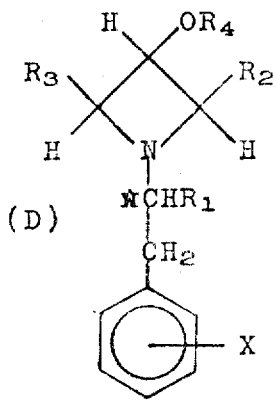

Signed and sealed this 15th day of February 1972.

(SEAL)
Attest:

EDWARD M.FLETCHER,JR.
Attesting Officer

ROBERT GOTTSCHALK
Commissioner of Patents